United States Patent
Roentgen et al.

(10) Patent No.: US 8,066,809 B2
(45) Date of Patent: Nov. 29, 2011

(54) RED REACTIVE DYES, THEIR PREPARATION AND THEIR USE

(75) Inventors: Georg Roentgen, Freiburg (DE); Laszlo Fekete, Magden (CH)

(73) Assignee: Huntsman International LLC, The Wodlands, TX (US)

( * ) Notice: Subject to any disclaimer, the term of this patent is extended or adjusted under 35 U.S.C. 154(b) by 230 days.

(21) Appl. No.: 12/377,059

(22) PCT Filed: Jul. 31, 2007

(86) PCT No.: PCT/EP2007/057873
§ 371 (c)(1),
(2), (4) Date: Feb. 10, 2009

(87) PCT Pub. No.: WO2008/017615
PCT Pub. Date: Feb. 14, 2008

(65) Prior Publication Data
US 2010/0159140 A1   Jun. 24, 2010

(30) Foreign Application Priority Data
Aug. 11, 2006  (EP) .................................. 06118789

(51) Int. Cl.
*C09D 11/02* (2006.01)
*C09B 62/01* (2006.01)
*B05D 5/06* (2006.01)

(52) U.S. Cl. ......... 106/31.48; 534/634; 8/549; 427/288

(58) Field of Classification Search ............... 106/31.48; 535/634; 534/797, 803; 8/549; 427/288
See application file for complete search history.

(56) References Cited

U.S. PATENT DOCUMENTS

| | | | |
|---|---|---|---|
| 4,925,927 A * | 5/1990 | Tzikas | ........................... 534/634 |
| 5,200,511 A | 4/1993 | Loeffler et al. | |
| 5,484,898 A | 1/1996 | Dietz et al. | |
| 5,548,071 A | 8/1996 | Dietz et al. | |
| 5,599,911 A | 2/1997 | Dietz et al. | |
| 5,820,661 A | 10/1998 | Gregory et al. | |
| 7,604,669 B2 * | 10/2009 | Sire et al. | ........................... 8/549 |

FOREIGN PATENT DOCUMENTS

| | | |
|---|---|---|
| EP | 0511523 A1 | 11/1992 |
| EP | 0624629 A1 | 11/1994 |
| EP | 0626429 A1 | 11/1994 |
| EP | 0641839 A2 | 3/1995 |
| GB | 2312437 A | 10/1997 |

* cited by examiner

*Primary Examiner* — Helene Klemanski

(57) ABSTRACT

Reactive dyes of formula

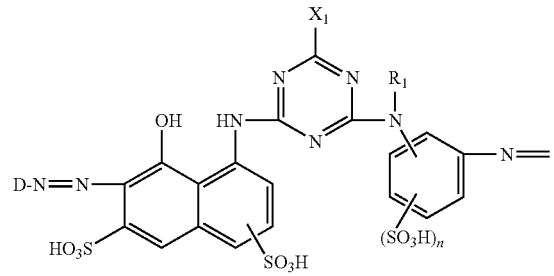
(1)

wherein
$R_1$ and $R_2$ independently of one another are hydrogen or unsubstituted or substituted $C_1$-$C_4$alkyl,
D is a radical of a diazo component of the formula

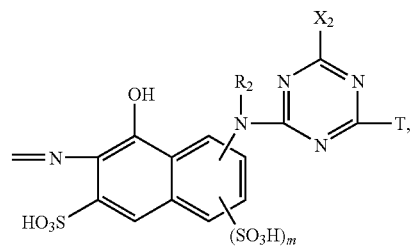
(2a)

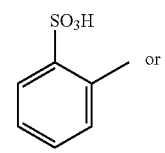

(2b)

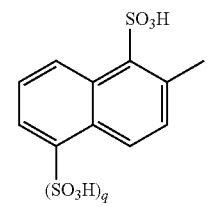

$X_1$ and $X_2$ independently of one another are halogen,
T is a fiber-reactive radical of the formula —NH—(CH$_2$)$_{2-3}$—SO$_2$—Z,   (3a)

—NH—(CH$_2$)$_{2-3}$—O—(CH$_2$)$_{2-3}$—SO$_2$—Z,   (3b)

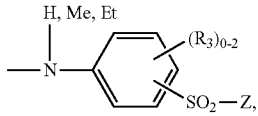 (3c)

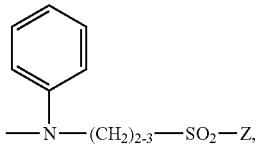 (3d)

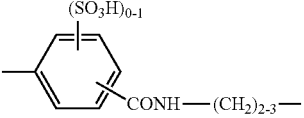 (3e)

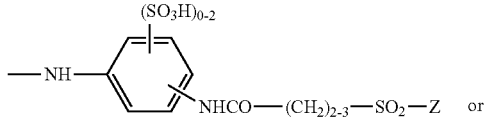 (3f)

or

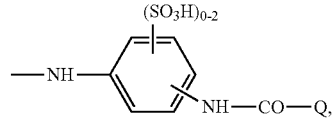 (3g)

$(R_3)_{0-2}$ denotes from 0 to 2 identical or different substituents from the group halogen, $C_1$-$C_4$alkyl, $C_1$-$C_4$alkoxy and sulfo, Z is vinyl or a —$CH_2$—$CH_2$—U radical and U is a group that is removable under alkaline conditions, Q is a —CH(Hal)-$CH_2$-Hal or —C(Hal)=$CH_2$ group, Hal is halogen, n is the number 0, 1 or 2, and m and q are independently of one another the number 0 or 1, are suitable for dyeing cellulosic or amide-group-containing fiber materials.

12 Claims, No Drawings

RED REACTIVE DYES, THEIR PREPARATION AND THEIR USE

CROSS REFERENCE TO RELATED APPLICATIONS

This application is the National Phase of International Application PCT/EP2007/057873 filed Jul. 31, 2007 which designated the U.S. and which claims priority to European Patent Application (EP) 06118789.4 filed Aug. 11, 2006. The noted applications are incorporated herein by reference.

The present invention relates to novel reactive dyes, to a process for their preparation and to their use in the dyeing or printing of textile fibre materials.

The practice of dyeing using reactive dyes has recently led to higher demands being made on the quality of the dyeings and the economic efficiency of the dyeing process. As a result, there continues to be a need for novel reactive dyes having improved properties, especially in respect of their application.

Dyeing nowadays requires reactive dyes that have sufficient substantivity and at the same time have good ease of washing off of unfixed dye. They should also have a good colour yield and high reactivity, the objective being to provide especially dyeings having high degrees of fixing and good fastness properties. The known dyes do not satisfy those requirements in all properties.

The dyes known from U.S. Pat. No. 5,599,911 still have certain disadvantages in terms of the required properties.

The problem underlying the present invention is accordingly to find, for the dyeing and printing of fibre materials, novel improved reactive dyes having the qualities characterised above to a high degree. The novel dyes should especially be distinguished by high fixing yields and high fibre-dye binding stabilities. The dyes should also yield dyeings having good allround fastness properties, for example fastness to light and to wetting.

It has been found that the problem posed is largely solved by the novel dyes defined hereinbelow.

The present invention accordingly relates to reactive dyes of formula

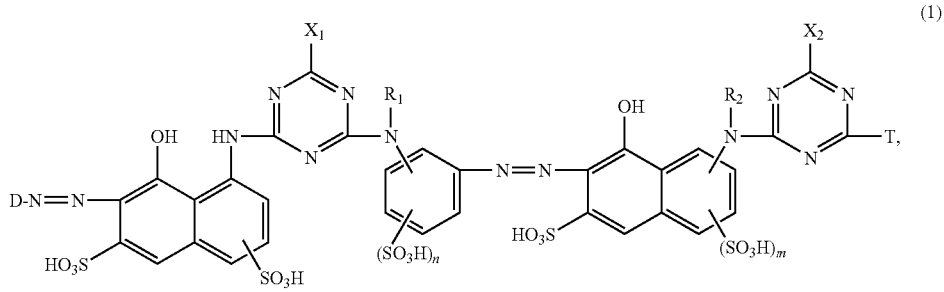

(1)

wherein $R_1$ and $R_2$ independently of one another are hydrogen or unsubstituted or substituted $C_1$-$C_4$alkyl, D is a radical of a diazo component of the formula

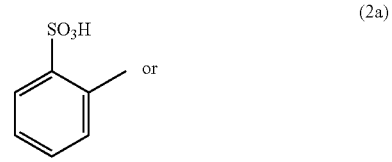

(2a)

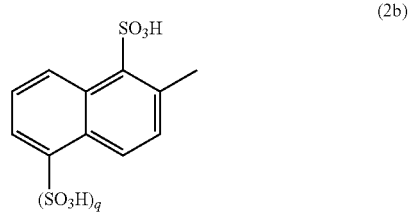

(2b)

$X_1$ and $X_2$ independently of one another are halogen,

T is a fibre-reactive radical of the formula

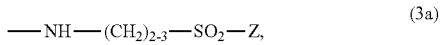

(3a)

(3b)

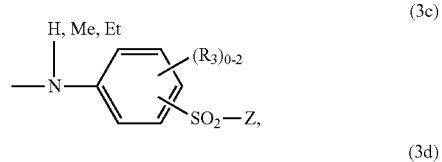

(3c)

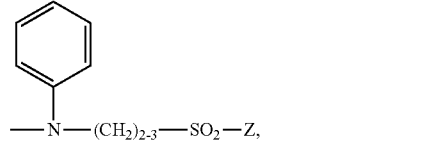

(3d)

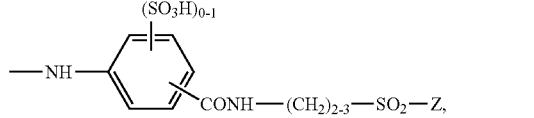

(3e)

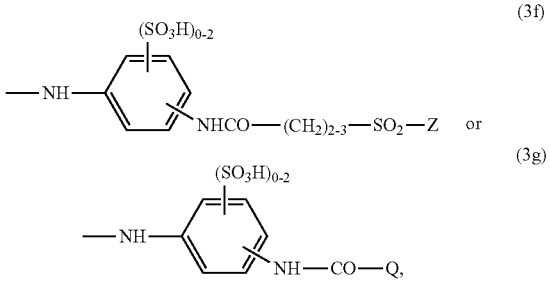

$(R_3)_{0-2}$ denotes from 0 to 2 identical or different substituents from the group halogen, $C_1$-$C_4$alkyl, $C_1$-$C_4$alkoxy and sulfo, Z is vinyl or a —$CH_2$—$CH_2$—U radical and U is a group that is removable under alkaline conditions, Q is a —CH(Hal)-$CH_2$-Hal or —C(Hal)=$CH_2$ group, Hal is halogen, n is the number 0, 1 or 2, and m and q are independently of one another the number 0 or 1.

In the radical of formula (3c), Me is the methyl radical and Et the ethyl radical. The said radicals are, in addition to hydrogen, suitable as substituents on the nitrogen atom.

As $C_1$-$C_4$alkyl there comes into consideration for $R_1$ and $R_2$, each independently of any other(s) for example, methyl, ethyl, propyl, isopropyl, n-butyl, sec-butyl, tert-butyl or isobutyl. The mentioned radicals may be unsubstituted or substituted, for example, by hydroxy, sulfo, sulfato, cyano, carboxy, $C_1$-$C_4$alkoxy or by phenyl, preferably by hydroxy, sulfato, $C_1$-$C_4$alkoxy or by phenyl. The corresponding unsubstituted radicals, especially methyl or ethyl, are preferred.

As $C_1$-$C_4$alkyl there comes into consideration for $R_3$, for example, methyl, ethyl, n-propyl, isopropyl, n-butyl, sec-butyl, tert-butyl or isobutyl, preferably methyl or ethyl and especially methyl.

As $C_1$-$C_4$alkoxy there comes into consideration for $R_3$, for example, methoxy, ethoxy, n-propoxy, isopropoxy, n-butoxy or isobutoxy, preferably methoxy or ethoxy and especially methoxy.

As halogen there comes into consideration for $R_3$, for example, fluorine, chlorine or bromine, preferably chlorine or bromine and especially chlorine.

Preferably D is a radical of the formula (2b), wherein q is as defined above.

$R_1$ is preferably hydrogen.

$R_2$ is preferably methyl or hydrogen, especially preferably hydrogen.

Preferably, $(R_3)_{0-2}$ denotes from 0 to 2 identical or different substituents from the group $C_1$-$C_4$alkyl, $C_1$-$C_4$alkoxy and sulfo, especially methyl, methoxy and sulfo.

$R_3$ is especially preferably hydrogen.

$X_1$ and $X_2$ each independently of any other(s) are, for example, fluorine, chlorine or bromine, preferably fluorine or chlorine and especially chlorine.

T is preferably a radical of formula (3c) or (3e), especially of formula (3c).

Hal in the fibre-reactive radical of formula (3g) is preferably chlorine or bromine, especially bromine.

As leaving group U there comes into consideration, for example, —Cl, —Br, —F, —$OSO_3H$, —$SSO_3H$, —OCO—$CH_3$, —$OPO_3H_2$, —OCO—$C_6H_5$, —$OSO_2$—$C_1$-$C_4$alkyl or —$OSO_2$—N($C_1$-$C_4$alkyl)$_2$. Preferably, U is a group of formula —Cl, —$OSO_3H$, —$SSO_3H$, —OCO—$CH_3$, —OCO—$C_6H_5$ or —$OPO_3H_2$, especially —Cl or —$OSO_3H$.

Examples of suitable radicals Z are accordingly vinyl, β-bromo- or β-chloroethyl, β-acetoxyethyl, β-benzoyloxyethyl, β-phosphatoethyl, β-sulfatoethyl and β-thiosulfatoethyl.

Z is preferably vinyl, β-chloroethyl or β-sulfatoethyl.

Preferably, m is the number 1.

Preferably, n is the number 1.

Preferably, q is the number 0.

The radical of formula (3c) is preferably a radical of formula

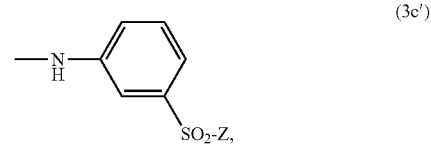

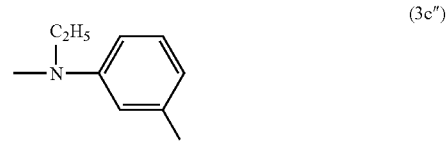

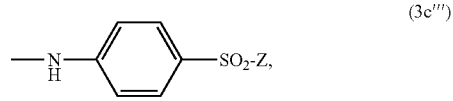

especially preferably (3c') or (3c''), wherein Z has the definitions and preferred meanings given above.

Preference is given to reactive dyes of formula

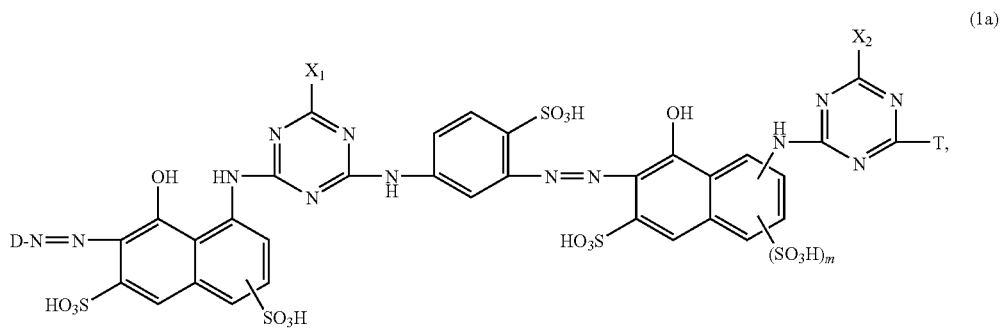

wherein

D, $X_1$, $X_2$, T and m each have the definitions and preferred meanings given above and, especially D is a radical of the formula (2b), wherein q is the number 0 or 1, preferably the number 0, $X_1$ and $X_2$ are chlorine, T is a radical of the above formula (3c), preferably (3c'), or (3c"), Z is vinyl, β-sulfatoethyl or β-chloroethyl, preferably vinyl or β-sulfatoethyl, and m is the number 1.

The dyes according to the invention are prepared by reacting with one another, in a suitable order, the compounds of formulae

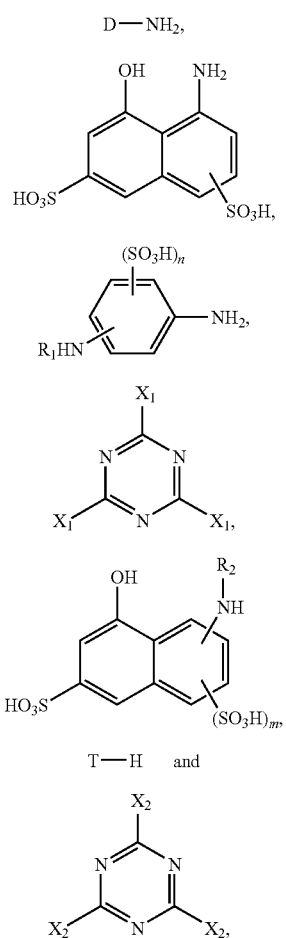

wherein D, $R_1$, $R_2$, $X_1$, $X_2$, T, m and n each have the definitions and preferred meanings given hereinabove, by condensation, diazotation and coupling reactions.

Preferably equimolar amounts, such as approximately one molar equivalent each of the compounds of formulae (4), (5), (6), (7), (8), (9) and (10) are used.

A suitable 2,4,6-Trihalo-s-triazin (cyanuric halide) of formula (7) or (10) is 2,4,6-Trichloro-s-triazin (cyanuric chloride) or 2,4,6-Trifluoro-s-triazin (cyanuric fluoride), especially cyanuric chloride.

Since the above compounds can be reacted with one another in different orders, and also, optionally, can be reacted with one another simultaneously, various process variants are possible. In general, the reaction is carried out stepwise, the order in which the single reactions between the individual reactants are carried out advantageously being governed by the particular conditions. In a preferred embodiment, (i) approximately one molar equivalent of a compound of formula (8) is condensed with approximately one molar equivalent of a compound of formula (10) to form a compound of formula

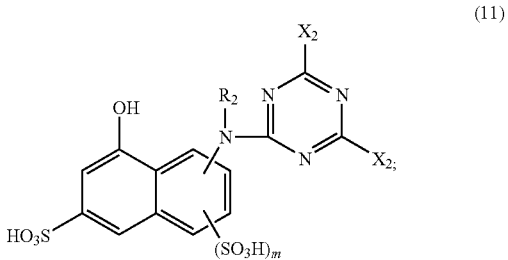

(ii) approximately one molar equivalent of a compound of formula (11) obtained according to (i) is reacted with approximately one molar equivalent of a compound of formula (9) to form a secondary condensation product of formula

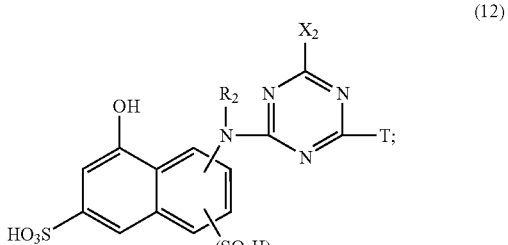

(iii) approximately one molar equivalent of a compound of formula (5) is condensed with approximately one molar equivalent of a compound of formula (7) to form a compound of formula

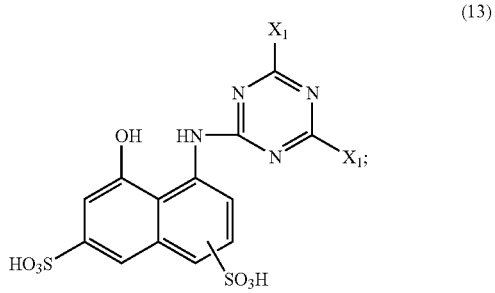

(iv) approximately one molar equivalent of a compound of formula (13) obtained according to (iii) is reacted with approximately one molar equivalent of a compound of formula (6) to form a secondary condensation product of formula

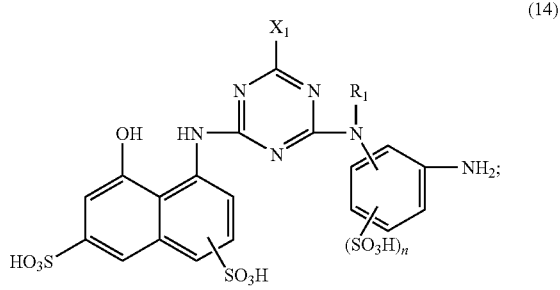

(v) approximately one molar equivalent of a compound of formula (4) is diazotised and coupled to approximately one molar equivalent of a compound of formula (14) obtained according to (iv) to form a product of formula

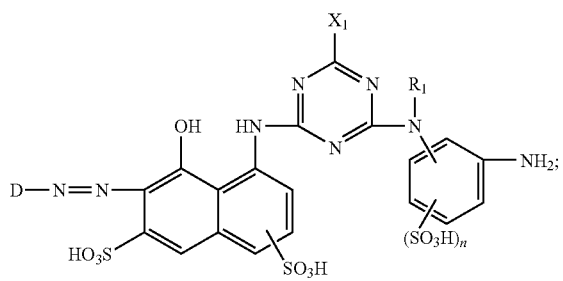

(vi) approximately one molar equivalent of a compound of formula (15) obtained according to (v) is diazotised and coupled to approximately one molar equivalent of a compound of formula (12) obtained according to (ii) to form a reactive dye of formula (1).

According to another embodiment, an azo compound of formula

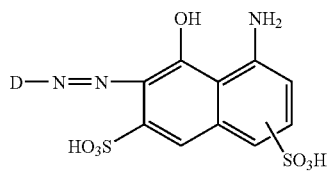

may be prepared in advance by diazotizing approximately one molar equivalent of a compound of formula (4) and coupling to approximately one molar equivalent of a compound of formula (5) and proceeding in accordance to (iii), wherein one molar equivalent of a compound of formula (16) is used instead of one molar equivalent of a compound of formula (5), (iv) and (vi) above.

Diazotisation and coupling are carried out in customary manner, for example by diazotising the compound of formula (4) or the compound of formula (15) in mineral acid solution, for example hydrochloric acid solution, with a nitrite, for example sodium nitrite, at low temperature, for example, at from 0 to 5° C. in the case of the compound of formula (4) or at from 10 to 30° C. in the case of the compound of formula (15), and then coupling with the corresponding coupling component in neutral to slightly acidic medium, for example at pH from 3 to 7.5, preferably from 3 to 4 or from 6 to 7.5, and at low to moderate temperatures, for example from 0 to 30° C.

The condensation reactions are generally carried out analogously to known methods, usually in aqueous solution at temperatures of, for example, from 0 to 30° C. and a pH value of, for example, from 2 to 10.

The compounds of formulae (4), (5), (6), (7), (8), (9) and (10) are known or can be prepared analogously to known compounds.

The reactive dyes of formula (1) contain sulfo groups, which are each either in the form of the free sulfo acid or, preferably, in the form of a salt thereof, for example a sodium, lithium, potassium or ammonium salt, or a salt of an organic amine, for example a triethanol-ammonium salt.

The reactive dyes of formula (1) may comprise further additives, for example sodium chloride or dextrin.

The reactive dyes of formula (1) according to the invention may optionally comprise further adjuvants which, for example, improve handling or increase storage stability, such as, for example, buffers, dispersants or anti-dusts. Such adjuvants are known to the person skilled in the art.

The dyes of formula (1) according to the invention are suitable for dyeing and printing an extremely wide variety of materials, such as hydroxyl-group-containing or nitrogen-containing fibre materials. Examples that may be mentioned are silk, leather, wool, polyamide fibres and polyurethanes, and especially cellulosic fibre materials of all kinds. Such cellulosic fibre materials are, for example, natural cellulosic fibres, such as cotton, linen and hemp, and also cellulose and regenerated cellulose. The dyes according to the invention are also suitable for dyeing or printing hydroxyl-group-containing fibres present in blend fabrics, e.g. blends of cotton with polyester fibres or polyamide fibres. The dyes according to the invention are especially suitable for dyeing or printing cellulosic, especially cotton-containing, fibre materials. They can furthermore be used in the dyeing or printing of natural or synthetic polyamide fibre materials.

The present invention accordingly relates also to the use of the dyes of formula (1) according to the invention in the dyeing or printing of hydroxyl-group-containing or nitrogen-containing, especially cellulosic, fibre materials.

The dyes of formula (1) according to the invention can be applied to the fibre material and fixed to the fibre in a variety of ways, especially in the form of aqueous dye solutions and print pastes. They are suitable both for the exhaust method and for dyeing in accordance with the pad-dyeing method, according to which the goods are impregnated with aqueous, optionally salt-containing, dye solutions and, after treatment with alkali or in the presence of alkali, the dyes are fixed, where appropriate with the action of heat or by storing for several hours at room temperature. After fixing, the dyeings or prints are rinsed thoroughly with cold and hot water, optionally with the addition of an agent that has a dispersing action and promotes the diffusion of unfixed dye.

The dyes according to the invention are distinguished by high reactivity, good fixing ability and a very good build-up behaviour. They can accordingly be used in accordance with the exhaust dyeing method at low dyeing temperatures and require only short steaming times in the pad-steam method. The degrees of fixing are high and unfixed dye can be washed off easily, the difference between the degree of exhaust and the degree of fixing being remarkably small, that is to say the soaping loss being very low. The dyes according to the invention are also suitable especially for printing, more especially on cotton, but are equally suitable also for printing nitrogen-containing fibres, for example wool or silk or blend fabrics that comprise wool or silk.

The dyeings and prints produced using the dyes according to the invention have a high tinctorial strength and a high fibre-to-dye binding stability in both the acidic and the alkaline range, and furthermore have good fastness to light and very good wet-fastness properties, such as fastness to washing, to water, to sea water, to cross-dyeing and to perspiration, as well as good fastness to pleating, to ironing and to rubbing. The dyeings obtained exhibit fibre levelness and surface levelness.

The dyes of formula (1) according to the invention are also suitable as colorants for use in recording systems. Suitable recording systems are, for example, commercially available ink-jet printers for paper or textile printing, or writing instruments, such as fountain pens or ballpoint pens, and especially ink-jet printers. For that purpose, the dyes according to the invention are first of all brought into a form suitable for use in recording systems. A suitable form is, for example, an aqueous ink, which comprises the dyes according to the invention as colorants. The inks can be prepared in customary manner by mixing together the individual components in the desired amount of water.

As substrates there come into consideration the above-mentioned hydroxyl-group-containing or nitrogen-containing fibre materials, especially cellulosic fibre materials. The fibre materials are preferably textile fibre materials.

Substrates that also come into consideration are paper and plastics films.

As examples of paper there may be mentioned commercially available ink-jet paper, photo paper, glossy paper, plastics-coated paper, e.g. Epson Ink-jet Paper, Epson Photo Paper, Epson Glossy Paper, Epson Glossy Film, HP Special Ink-jet Paper, Encad Photo Gloss Paper and Ilford Photo Paper. Plastics films are, for example, transparent or cloudy/opaque. Suitable plastics films are, for example, 3M Transparency Film.

Depending on the nature of the use, for example textile printing or paper printing, it may be necessary, for example, for the viscosity or other physical properties of the ink, especially properties that have an influence on the affinity for the substrate in question, to be adapted accordingly.

The dyes used in the aqueous inks should preferably have a low salt content, that is to say they should have a total content of salts of less than 0.5% by weight, based on the weight of the dyes. Dyes that have relatively high salt contents as a result of their preparation and/or as a result of the subsequent addition of diluents can be desalted, for example by membrane separation procedures, such as ultrafiltration, reverse osmosis or dialysis.

The inks preferably have a total content of dyes of from 1 to 35% by weight, especially from 1 to 30% by weight and preferably from 1 to 20% by weight, based on the total weight of the ink. The preferred lower limit in this case is a limit of 1.5% by weight, preferably 2% by weight and especially 3% by weight.

The inks may comprise water-miscible organic solvents, for example $C_1$-$C_4$alcohols, e.g. methanol, ethanol, n-propanol, isopropanol, n-butanol, sec-butanol, tert-butanol or iso-butanol; amides, e.g. dimethylformamide or dimethylacetamide; ketones or ketone alcohols, e.g. acetone or diacetone alcohol; ethers, e.g. tetrahydrofuran or dioxane; nitrogen-containing heterocyclic compounds, e.g. N-methyl-2-pyrrolidone or 1,3-dimethyl-2-imidazolidone, polyalkylene glycols, e.g. polyethylene glycol or polypropylene glycol; $C_2$-$C_6$alkylene glycols and thioglycols, e.g. ethylene glycol, propylene glycol, butylene glycol, triethylene glycol, thiodiglycol, hexylene glycol and diethylene glycol; other polyols, e.g. glycerol or 1,2,6-hexanetriol; and $C_1$-$C_4$alkyl ethers of polyhydric alcohols, e.g. 2-methoxyethanol, 2-(2-methoxyethoxy)ethanol, 2-(2-ethoxyethoxy)ethanol, 2-[2-(2-methoxyethoxy)ethoxy]ethanol or 2-[2-(2-ethoxyethoxy)ethoxy]ethanol; preferably N-methyl-2-pyrrolidone, diethylene glycol, glycerol or especially 1,2-propylene glycol, usually in an amount of from 2 to 30% by weight, especially from 5 to 30% by weight and preferably from 10 to 25% by weight, based on the total weight of the ink.

In addition, the inks may also comprise solubilisers, e.g. ε-caprolactam.

The inks may comprise thickeners of natural or synthetic origin, inter alia for the purpose of adjusting the viscosity.

Examples of thickeners that may be mentioned include commercially available alginate thickeners, starch ethers or locust bean flour ethers, especially sodium alginate on its own or in admixture with modified cellulose, e.g. methyl cellulose, ethyl cellulose, carboxymethyl cellulose, hydroxyethyl cellulose, methyl hydroxyethyl cellulose, hydroxypropyl cellulose or hydroxypropyl methyl cellulose, especially with preferably from 20 to 25% by weight carboxymethyl cellulose. Synthetic thickeners that may be mentioned are, for example, those based on poly(meth)acrylic acids or poly(meth)acrylamides and also polyalkylene glycols having a molecular weight of, for example, from 2000 to 20 000, such as, for example, polyethylene glycol or polypropylene glycol or mixed polyalkylene glycols of ethylene oxide and propylene oxide.

The inks comprise such thickeners, for example, in an amount of from 0.01 to 2% by weight, especially from 0.01 to 1% by weight and preferably from 0.01 to 0.5% by weight, based on the total weight of the ink.

The inks may also comprise buffer substances, e.g. borax, borates, phosphates, polyphosphates or citrates. Examples that may be mentioned include borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

As further additives, the inks may comprise surfactants or humectants.

Suitable surfactants include commercially available anionic or non-ionic surfactants. As humectants in the inks according to the invention there come into consideration, for example, urea or a mixture of sodium lactate (advantageously in the form of a 50% to 60% aqueous solution) and glycerol and/or propylene glycol in amounts of preferably from 0.1 to 30% by weight, especially from 2 to 30% by weight.

Preference is given to inks having a viscosity of from 1 to 40 mPa·s, especially from 1 to 20 mPa·s and more especially from 1 to 10 mPa·s.

Furthermore, the inks may in addition comprise customary additives, e.g. anti-foams or especially preservatives that inhibit fungal and/or bacterial growth. Such additives are usually used in amounts of from 0.01 to 1% by weight, based on the total weight of the ink.

As preservatives there come into consideration formaldehyde-yielding agents, for example paraformaldehyde and trioxane, especially aqueous, approximately from 30 to 40% by weight formaldehyde solutions, imidazole compounds, for example 2-(4-thiazolyl)-benzimidazole, thiazole compounds, for example 1,2-benzisothiazolin-3-one or 2-n-octyl-isothiazolin-3-one, iodine compounds, nitriles, phenols, haloalkylthio compounds or pyridine derivatives, especially 1,2-benzisothiazolin-3-one or 2-n-octyl-isothiazolin-3-one.

A suitable preservative is, for example, a 20% by weight solution of 1,2-benzisothiazolin-3-one in dipropylene glycol (Proxel® GXL).

The inks may also comprise further additives, such as fluorinated polymers or telomers, for example polyethoxyperfluoroalcohols (Forafac® or Zonyl®products) in an amount of, for example, from 0.01 to 1% by weight, based on the total weight of the ink.

In the case of the ink-jet printing method, individual droplets of ink are sprayed onto a substrate from a nozzle in a controlled manner. It is mainly the continuous ink-jet method and the drop-on-demand method that are used for that purpose. In the case of the continuous ink-jet method, the droplets are produced continuously, droplets not required for the printing operation being discharged into a receptacle and recycled. In the case of the drop-on-demand method, on the other hand, droplets are generated as desired and used for printing; that is to say, droplets are generated only when required for the printing operation. The production of the droplets can be effected, for example, by means of a piezo ink-jet head or by thermal energy (bubble jet). Preference is given to printing by means of a piezo ink-jet head and to printing according to the continuous ink-jet method.

The present invention accordingly relates also to aqueous inks that comprise the dyes of formula (1) according to the invention and to the use of such inks in an ink-jet printing method for printing a variety of substrates, especially textile fibre materials, the definitions and preferences indicated above applying to the dyes, the inks and the substrates.

The following Examples serve to illustrate the invention. Unless otherwise indicated, the temperatures are given in degrees Celsius, parts are parts by weight and percentages relate to % by weight. Parts by weight relate to parts by volume in a ratio of kilograms to liters.

EXAMPLE 1

(a) 40 parts of a neutral solution of 1-amino-8-hydroxynaphthalene-3,6-disulfonic acid (H-acid) in 200 parts of water are added drop wise at pH 2-2.5 and 0-5° C. to a fine suspension of 23.5 parts of cyanuric chloride in 100 parts by volume of water and 100 parts of ice. The mixture is adjusted to pH 2.5 by means of hydrochloric acid. During the addition the reaction temperature is maintained at 0-5° C. by cooling. After the addition is finished the pH is maintained at pH 2 with a soda ash solution (20%) until the reaction is complete.

(b) A neutral solution of 35 parts of 3-(β-sulfatoethylsulfonyl) aniline in water is added to the reaction mixture obtained according to (a). The pH is adjusted to 4.5-5 with a soda ash solution (20%) and maintained at these conditions. The temperature is rising (5-25° C.) until the reaction is complete. The mixture obtained contains a compound which, in the form of the free acid, corresponds to formula

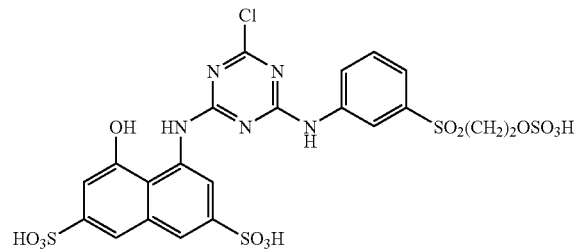

(c) 31 parts of hydrochloric acid (32%) are added to a neutral solution of 105 parts of the following intermediate

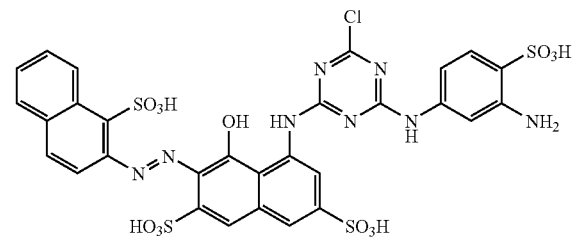

in 4000 parts of water. 32 parts by volume of sodium nitrite 4 N are added drop wise at 20-30° C. to this solution. An excess of sodium nitrite must be indicated by starch-iodide paper after the addition is finished. The reaction mass is stirred until diazotization is complete. Excess of nitrite is then removed by addition of sulfamic acid.

(d) The diazo mixture obtained according to (c) is dosed to the cooled mixture obtained according to (b) at 5 to 25° C. maintaining the reaction mixture at pH 6.5-7.5 by means of sodium hydroxide solution. The resulting reaction mass is stirred until coupling is complete, desalinated by dialysis and dried by lyophilisation. A dye is obtained as a powder ($\lambda_{max}$=518 nm) which, in the form of the free acid, corresponds to formula (101)

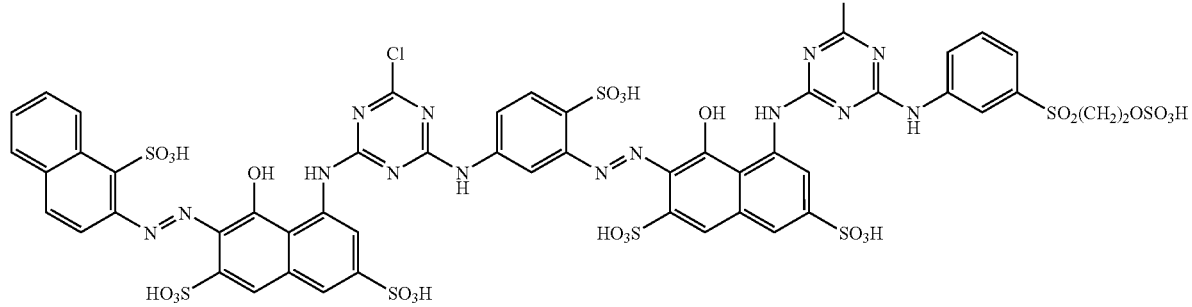

The dye prints or dyes cellulose in a brilliant red shade with good fastness properties.

EXAMPLES 2 TO 9
Analogously to the Procedure Described In Example 1, the Compounds of Formulae
2
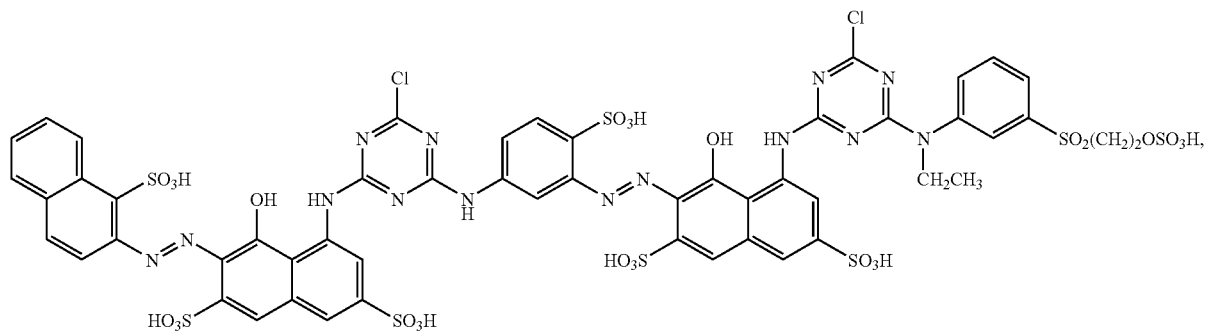
(102)
($\lambda_{max}$ = 516 nm)
3
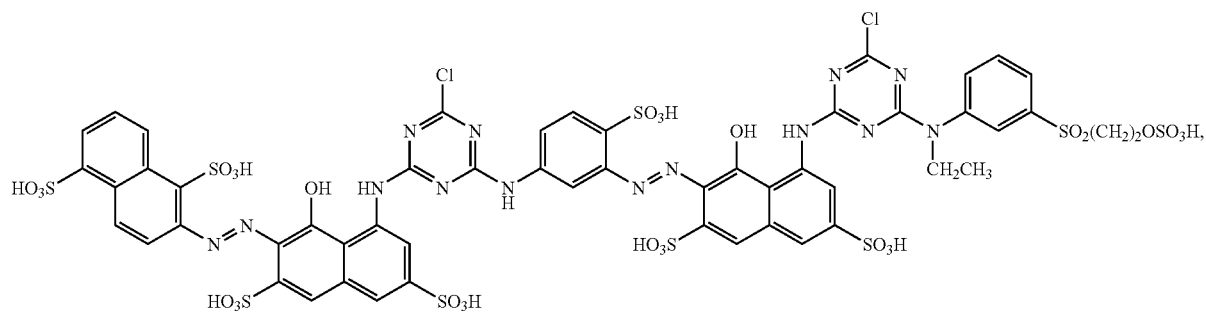
(103)
($\lambda_{max}$ = 544 nm)
4
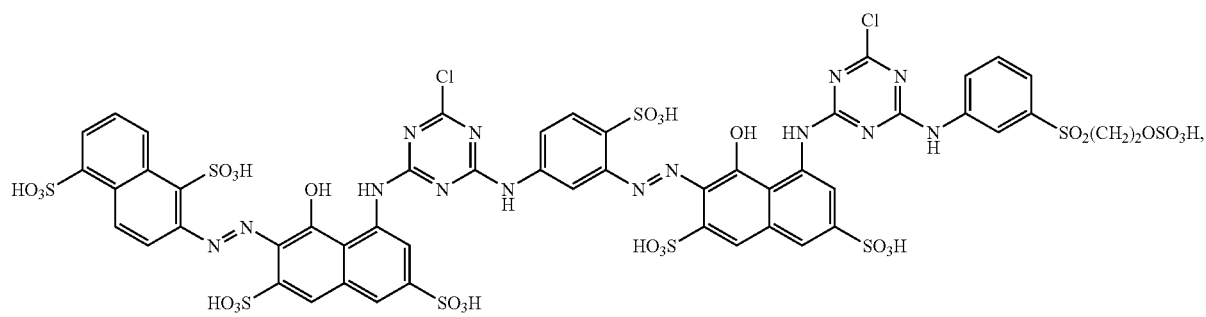
(104)
($\lambda_{max}$ = 544 nm)
5

-continued
(105)
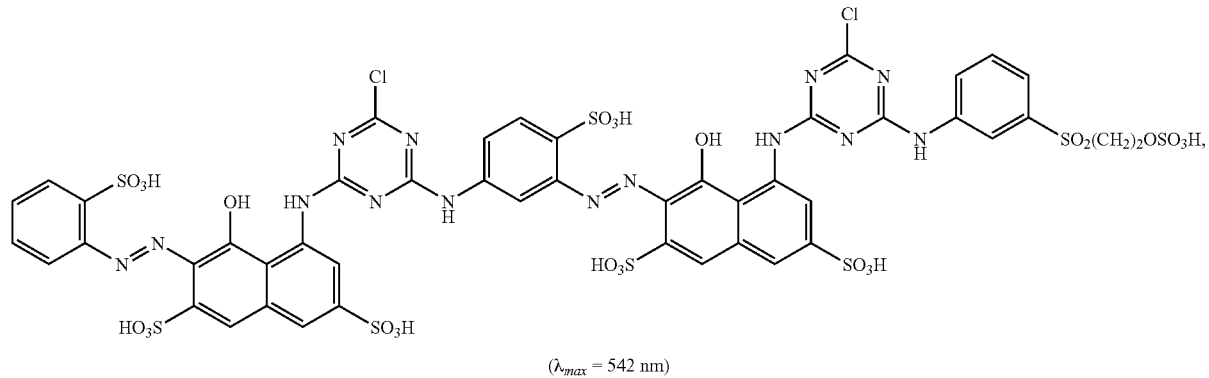
(λ_max = 542 nm)
6
(106)
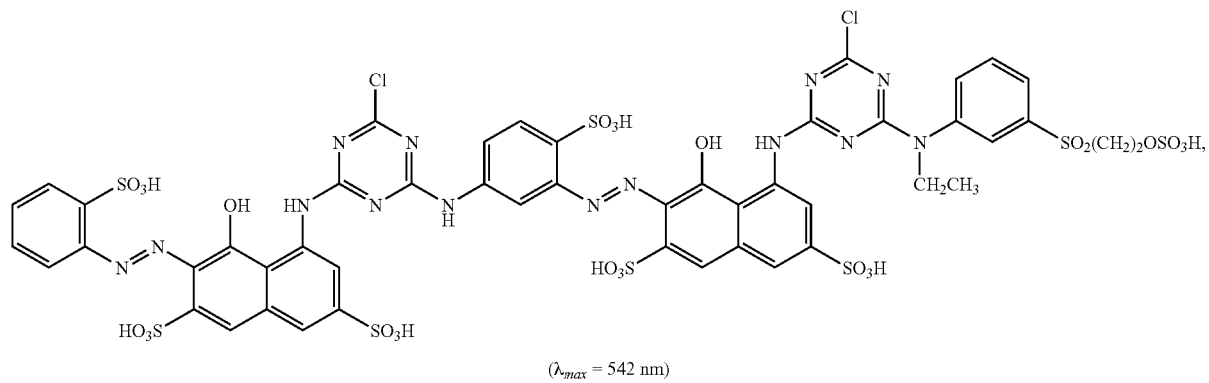
(λ_max = 542 nm)
7
(107)
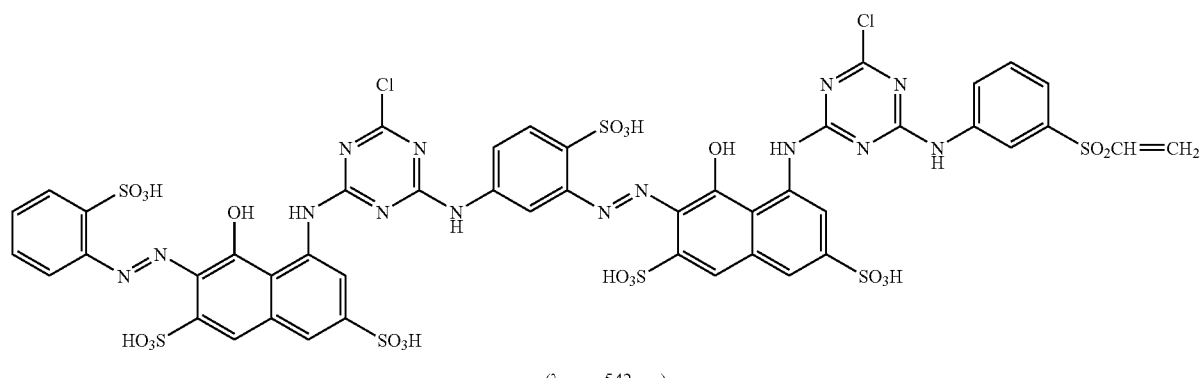
(λ_max = 542 nm)
8

-continued

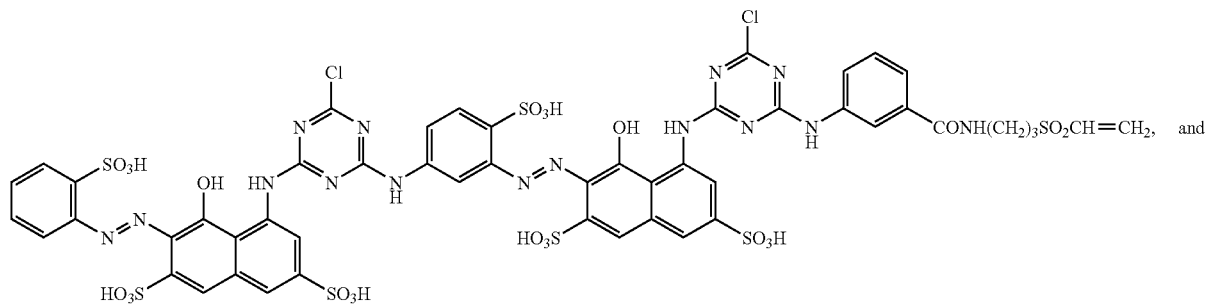

(108)

($\lambda_{max}$ = 542 nm)

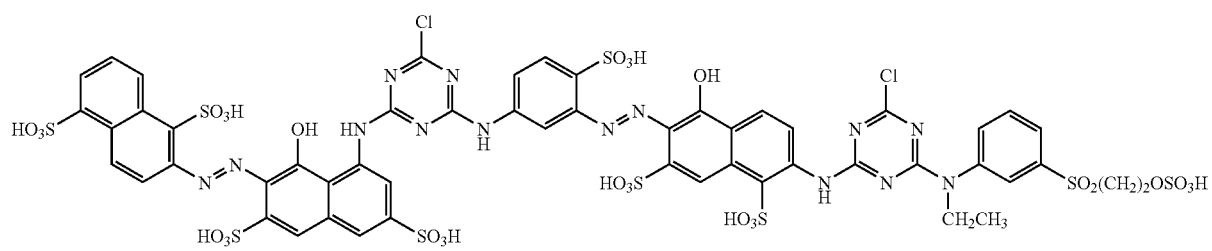

(109)

($\lambda_{max}$ = 514 nm)

can be prepared, which likewise yield brilliant red shaded dyeings or prints on cellulose having good fastness properties.

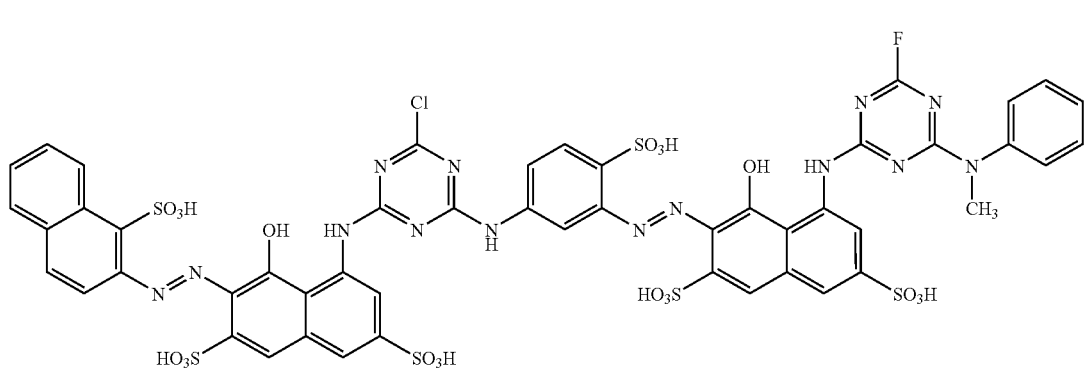

(110)

Dyeing Procedure I

X % (see Table 1 below) of the dyestuff of formula (101) according to Example 1 or the dyestuff known in the art according to formula (110), respectively, are dissolved in 400 parts of water. To this solution are added 500 parts of a solution which contains Y g/l (see Table 1 below) of common salt (sodium chloride). 100 parts of non-mercerized cotton tricot are introduced into the dye bath at 80° C. The temperature is maintained for 15 minutes and then increased to 90° C. within 5 minutes. After 30 minutes at 90° C. the temperature is decreased to 70° C. within 10 minutes whereupon 100 parts of a solution containing $Z_1$ g/l (see Table 1 below) of calcined sodium carbonate (soda ash) are added. After 15 minutes at 70° C. $Z_2$ ml/l (see Table 1 below) NaOH (36° Bé) are added. Dyeing is continued for a further 30 minutes at this temperature. The dyed goods are then rinsed, soaped at the boil for a quarter of an hour with a non-ionic detergent, rinsed again and dried.

TABLE 1

| Salt and Alkali Recommendations | | | |
|---|---|---|---|
| Dyestuff X % | Common Salt Y g/l | Soda ash $Z_1$ g/l | NaOH $Z_2$ ml/l |
| 0.25 | 10 | 5 | 1 |
| 0.50 | 10 | 5 | 1 |
| 1.00 | 15 | 5 | 1.25 |
| 2.00 | 25 | 5 | 1.75 |
| 4.00 | 40 | 5 | 2.5 |
| 6.00 | 40 | 5 | 2.5 |
| 8.00 | 40 | 5 | 2.5 |

TABLE 2

Build-up: dependence of reference depth (RD) from dyestuff concentration

| | Dyestuff X % | | | | | | |
|---|---|---|---|---|---|---|---|
| | 0.25 | 0.50 | 1.00 | 2.00 | 4.00 | 6.00 | 8.00 |
| RD Dyestuff of formula (101) | 0.17 | 0.32 | 0.60 | 1.09 | 1.74 | 2.03 | 2.11 |
| RD Dyestuff of formula (110) | 0.13 | 0.22 | 0.42 | 0.86 | 1.52 | 1.82 | 2.03 |

Table 2 shows that build-up of the dyestuff of formula (101) according to Example 1 is superior to the build-up properties of the dyestuff of formula (110) known in the art. Furthermore, washing-off properties of the dyestuff of formula (101) according to the present invention are improved with respect to the dyestuff of formula (110).

Degree of fixation of the dyestuff of formula (101) according to the present invention is 75%, whereas the dyestuff of formula (110) known in the art shows a degree of fixation of only 66%.

Dyeing Procedure II 100 parts of cotton fabric are introduced at 70° C. into 1500 parts of a dye bath containing 20 g/l of sodium chloride and 2 parts of the reactive dye obtained according to Example 1. After 45 minutes at 70° C., 5 g/l of calcined soda and after additional 10 minutes 2 ml/l NaOH (36° Bé) are added. Dyeing is continued for a further 45 minutes at that temperature. The dyed goods are then rinsed, soaped at the boil for a quarter of an hour with a non-ionic detergent, rinsed again and dried.

As an alternative to the above procedure, the dyeing can be carried out at 80° C. instead of at 70° C.

Dyeing Procedure III 0.1 part of the dye according to Example 1 is dissolved in 200 parts of water, and 0.5 part of sodium sulfate, 0.1 part of a leveling agent (based on the condensation product of a higher aliphatic amine and ethylene oxide) and also 0.5 part of sodium acetate are added. The pH is then adjusted to a value of 5.5 using acetic acid (80%). The dye bath is heated at 50° C. for 10 minutes and then 10 parts of a woollen fabric are added. Heating is then carried out in the course of approximately 50 minutes to a temperature of 100° C. and dyeing is carried out at that temperature for 60 minutes, after which the dye bath is allowed to cool to 90° C. and the dyed goods are removed. The woollen fabric is washed with hot and cold water, and is then spun and dried.

Printing Procedure I 3 parts of the dye obtained according to Example 1 are sprinkled, with rapid stirring, into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric, and the resulting printed material is dried and steamed in saturated steam for 2 minutes at 102° C. The printed fabric is then rinsed, if desired soaped at the boil and rinsed again, and subsequently dried.

Printing Procedure II (a) Mercerised cotton satin is pad-dyed with a liquor containing 30 g/l of sodium carbonate and 50 g/l of urea (70% liquor pick-up) and dried.

(b) Using a drop-on-demand ink-jet head (bubble jet), the cotton satin pretreated according to Step (a) is printed with an aqueous ink containing 15% by weight of the reactive dye of formula (101) according to Example 1, 15% by weight of 1,2-propylene glycol and 70% by weight of water.

The print is dried completely and fixed in saturated steam for 8 minutes at 102° C., cold-rinsed, washed off at the boil, rinsed again and dried.

What is claimed is:

1. A reactive dye of formula

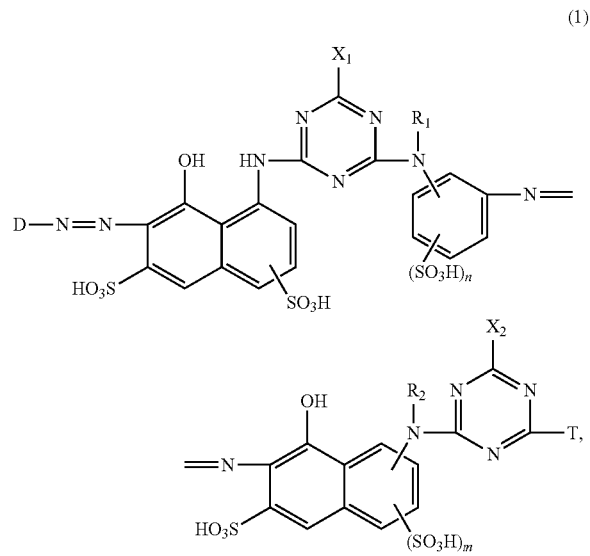

(1)

wherein $R_1$ and $R_2$ independently of one another are hydrogen or unsubstituted or substituted $C_1$-$C_4$ alkyl, D is a radical of a diazo component of the formula

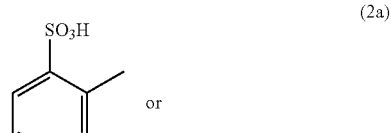

(2a)

or (2b)

$X_1$ and $X_2$ independently of one another are halogen,

T is a fibre-reactive radical of the formula

—NH—$(CH_2)_{2\text{-}3}$—$SO_2$—Z, (3a)

—NH—$(CH_2)_{2\text{-}3}$—O—$(CH_2)_{2\text{-}3}$—$SO_2$—Z, (3b)

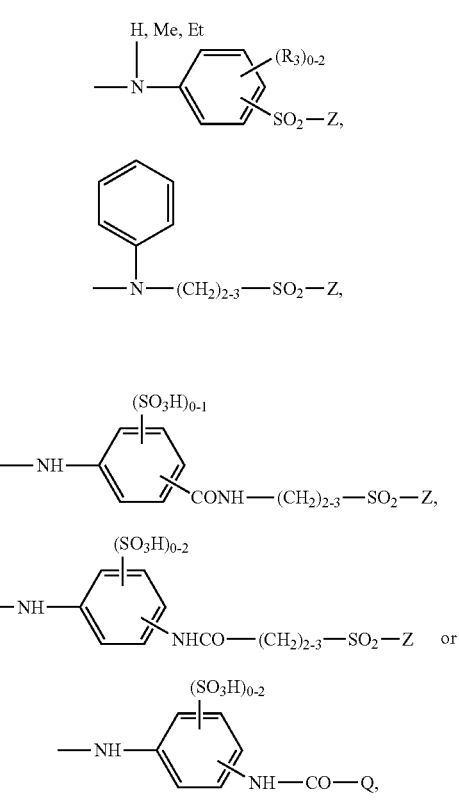

(R₃)₀₋₂ denotes from 0 to 2 identical or different substituents from the group halogen, $C_1$-$C_4$ alkyl, $C_1$-$C_4$ alkoxy and sulfo, Z is vinyl or a —CH₂—CH₂-U radical and U is a group that is removable under alkaline conditions, Q is a —CH(Hal)-CH₂-Hal or —C(Hal)=CH₂ group, Hal is halogen, n is the number 0, 1 or 2, and m and q are independently of one another the number 0 or 1.

2. A reactive dye according to claim 1, wherein $R_1$ and $R_2$ are hydrogen.

3. A reactive dye according to claim 1 wherein $X_1$ and $X_2$ independently from one another are chloro or fluoro.

4. A reactive dye according to claim 1 wherein Z is vinyl, β-chloroethyl or β-sulfatoethyl.

5. A reactive dye according to claim 1 that corresponds to formula

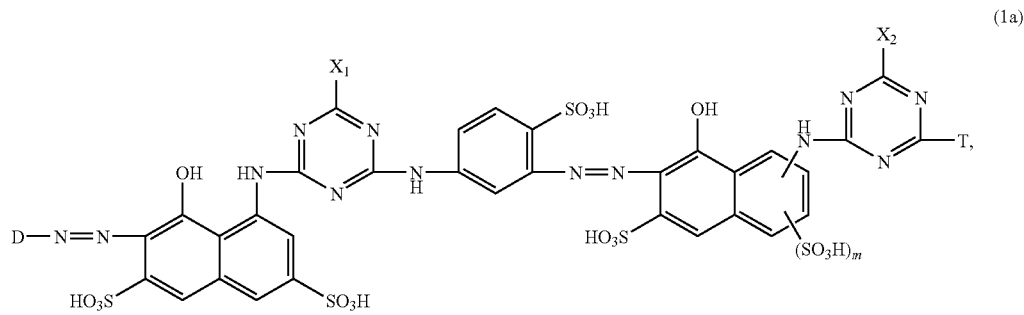

wherein

D, $X_1$, $X_2$, T and m are each as defined in claim 1.

6. A reactive dye according to claim 5, wherein T is a radical of formula

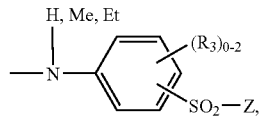

(R₃)₀₋₂ denotes from 0 to 2 identical or different substituents from the group methyl, methoxy and sulfo, Z is vinyl, β-chloroethyl or β-sulfatoethyl, Me is the methyl radical and Et the ethyl radical, and m is the number 1.

7. A reactive dye according to claim 1 wherein D is a radical of a diazo component of the formula

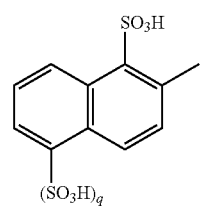

$X_1$ and $X_2$ are chlorine,

T is a radical of formula

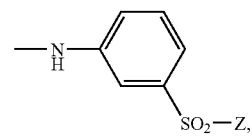

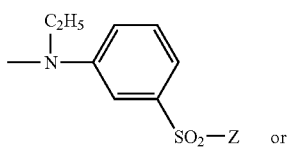

-continued

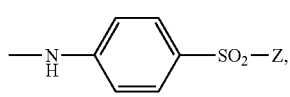 (3c''')

Z is vinyl or β-sulfatoethyl,
m is the number 1, and
q is the number 0.

8. A process for the preparation of a reactive dye of formula (1) according to claim 1, which comprises reacting with one another, in a suitable order, the compounds of formulae

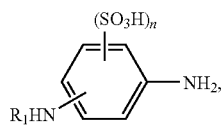 (4)

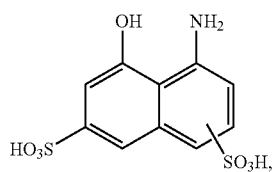 (5)

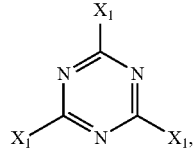 (6)

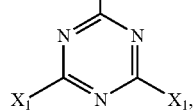 (7)

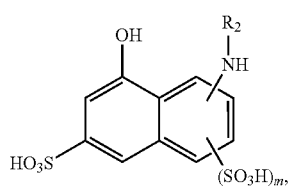 (8)

T—H (9)

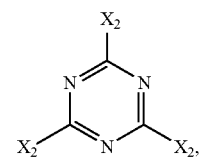 (10)

wherein D, $R_1$, $R_2$, $X_1$, $X_2$, T, n and m are each as defined in claim 1, by condensation, diazotation and coupling reactions.

9. An aqueous ink that comprises a reactive dye of formula (1) according to claim 1.

10. A process for printing textile fibre material, paper or plastics film according to the ink-jet printing method, which comprises applying an aqueous ink according to claim 9 to the textile fibre material, paper or plastics film.

11. A method of dyeing or printing a hydroxyl-group-containing or nitrogen-containing fibre material comprising applying a reactive dye according to claim 1 to the fibre material.

12. The method of claim 11 wherein the fibre material is cellulosic fibre material.

* * * * *